United States Patent [19]

Wolf et al.

[11] Patent Number: 4,464,065
[45] Date of Patent: Aug. 7, 1984

[54] FAST GRANULAR SUPERCONDUCTING BOLOMETER

[75] Inventors: Stuart A. Wolf, Greenbelt; Ulrich Strom, Hyattsville, both of Md.; Kurt Weiser, Haifa, Israel

[73] Assignee: The United States of America as represented by the Secretary of the Navy, Washington, D.C.

[21] Appl. No.: 406,428

[22] Filed: Aug. 9, 1982
(Under 37 CFR 1.47)

[51] Int. Cl.³ ............................................. G01N 25/20
[52] U.S. Cl. ...................................... 374/121; 374/43; 338/18
[58] Field of Search ................... 374/120, 121, 44, 43, 374/32; 338/15, 18

[56] References Cited

U.S. PATENT DOCUMENTS

| | | | |
|---|---|---|---|
| 2,766,144 | 10/1956 | Lidow | 338/15 |
| 3,898,605 | 8/1975 | Burns | 338/18 |
| 3,912,612 | 10/1975 | Gavaler et al. | 204/192 |
| 3,961,998 | 6/1976 | Scharnhorst et al. | 338/15 |
| 4,279,969 | 7/1981 | Francavilla et al. | 428/698 |
| 4,297,392 | 10/1981 | Higashi et al. | 338/15 |
| 4,349,808 | 9/1982 | Kraus | 338/18 |

OTHER PUBLICATIONS

S. A. Wolf et al., Two Dimensional Phase Transitions in Granular NbN Films, Physical Review Letters, Oct. 12, 1981, vol. 47, pp. 1071-1074.
R. J. von Gutfeld, Thermal Relaxation of Indium Films on Insulating Substrates Between 4 and 300K. J. of Applied Physics, Sep. 1966, vol. 37, pp. 3767-3771.
Sinha, ed., Ordering in Two Dimensions, 1980, pp. 471-474.
V. Narayanamurti et al., Direct Observation of Phonons Generated During Non-Radiative Capture in GaAs p-n Junctions, Physical Review Letters, Jan. 2, 1978, vol. 40, pp. 63-66.
K. Weiser et al., Use of Granular NbN as a Superconducting Bolometer, J. Applied Physics, Jul. 1981, vol. 7, pp. 4385-4389.
S. Wolf et al., Properties of Superconducting rf Sputtered Ultrathin Films of Nb, J. Vacuum Science of Technology, Jan./Feb. 1976, vol. 13, pp. 145-147.
R. J. von Gutfeld, Heat Pulses in Quartz and Sapphire at Low Temperatures, Physical Review Letters, Jun. 8, 1964, vol. 12, pp. 641-644.

*Primary Examiner*—Charles Frankfort
*Assistant Examiner*—David R. Schuster
*Attorney, Agent, or Firm*—Robert F. Beers; William T. Ellis; Charles S. Guenzer

[57] ABSTRACT

A granular superconducting thin film bolometer made by anodizing a thin film of such materials as niobium nitride to form a thin granular film separated by and covered with the anodized oxide. The bolometer is cooled to its superconducting state and electrically connected to a biasing and detecting network. Its temporal response is better than 1 ns.

8 Claims, 7 Drawing Figures

FAST GRANULAR SUPERCONDUCTING BOLOMETER

BACKGROUND OF THE INVENTION

The present invention relates in general to bolometers, i.e. temperature measuring devices utilizing a temperature dependent resistance, and in particular to an ultrafast superconducting bolometer.

The measurement of temperature is one of the chief tools for the measurement of a host of other physical quantities. Besides the usual measurement of ambient temperature as would be performed by a thermometer, temperature measuring devices can be used in conjunction with a heat-isolated chamber in which some other mechanism occurs which releases or absorbs heat. If the specific heat of the chamber is controlled, the resulting temperature changes measure the energetics of the mechanism occuring within the chamber. Examples of such uses are the heat of reaction in a chemical reaction, phase changes indicated by changes in specific heat, absorbed microwave power and radiance of an infrared source.

Some related applications do not require thermal equilibrium between the thermal sensor and the heat source. In such applications as photon detectors and phonon detectors, a packet of waves is absorbed by the detector or a secondary absorber in contact with the detector and the wave energy is converted into an equivalent quantity of heat. The detector's temperature rise is related to the energy of the wave packet. In this use the incident waves are not continuous but form a pulse so that the wave packet is detected as a temperature pulse if the detector is in good thermal contact to a heat sink. Such use requires high responsivity per unit of incident energy because the heat content per pulse is low. Furthermore, if such a photon or phonon detector is being used where the information rate is high, e.g. in a submillimeter wave communication network or a phonon signal processor, the detector must have very fast response. R. J. von Gutfeld and A. H. Nethercot, Jr. in Physical Review Letters, vol. 12, pages 641-644, 1966 have described the propagation of phonons or a heat pulse and their detection by bolometers which are resistive components inserted in an electrical circuit the resistance of which is strongly temperature dependent. Some of the temperature measuring techniques other than bolometers in the above fields of measurement include thermocouples and thermistors. Thermocouples measure temperature by sensing the voltage present across a junction of dissimilar metals, which voltage varies with temperature. Thermistors are temperature dependent semiconductive resistors which are quite sensitive between $-100°$ and $300°$ C. However such temperature measuring devices have a rather limited temporal response because of their significant bulk. For example, fast thermocouples have temporal responses measured in milliseconds.

The time response of bolometers can be improved if they are made in the form of an electrically conducting thin film deposited upon an substrate that is thermally conducting but electrically insulating. For pulsed wave detectors, such construction has the potential of providing a good heat sink through the substrate to more elaborate cooling means so that a wave pulse is converted into a temperature pulse in the bolometer which in turn is detected as a current or voltage pulse by the detecting electrical network. However fast response to heat pulses implies that heat flows quickly from the active volume of the bolometer so that relatively little energy is available to drive the detector. As a result high responsivity in the bolometer is required.

The fast response of metallic thin film bolometers relies on the small specific heat associated with a thin film such that the heat generated in the film can be quickly drawn off into the substrate. The thinner the metal film, the more quickly can the heat be dissipated. Von Gutfeld and Nethercot in another article in Physical Review, vol. 37, pages 3767-3771, 1966 describe the use of both normal and superconducting indium films on sapphire substrates with thermal response times of down to 2 ns. The temporal response is limited by the thinness at which metallic thin films can be grown on a dissimilar insulating substrate and have acceptable conduction or superconducting characteristics. It appears that 50 to 100 nm is a lower limit for the thickness of self-supporting metal films with the best response times being the 2 ns previously quoted.

The responsivity of superconducting bolometers can be enhanced by operating them near their transition temperatures where the temperature dependence of the bolometers resistance is relative large. However these usually quite low transition temperatures require complex equipment and restrict the applications for which superconducting bolometers can be used. For example, film bolometers have been reported with ambient temperatures of $3.8°$ K. for superconducting In-Sn, of $8°$ K. for superconducting Pb-Bi and of $1.5°$ K. for superconducting granular aluminum.

A general problem with thin-film superconducting bolometers is that they tend to be made of exotic materials with poor mechanical characteristics and which are prone to chemically react and hence change their superconducting characteristics. Their thinness causes minor scratches to produce major changes in performance.

SUMMARY OF THE INVENTION

It is therefore an object of this invention to provide a bolometer that has ultrafast response.

It is a further object of this invention to provide a superconducting bolometer that can operate at relatively high temperatures.

It is another object of this invention to provide a sensitive time-resolved phonon detector.

The bolometer consists of a granular thin film that has been nearly completely anodized. The granular thin film is superconducting at the bolometer operating temperature but is held at a temperature for which the resistance is strongly temperature dependent. Niobium nitride forms such a granular film. The thin film is mounted on a highly heat-conducting substrate such as sapphire. The thin film is biased with an operating current and coupled to a monitoring or detecting circuit so that electronic instrumentation can measure resistance changes induced by changes in temperature of the bolometer.

The bolometer of this invention has been shown to have a very fast response, less than 1 ns by measurement and believed to be less than 100 ps, is sensitive to the order of 5000 ohm/$°$K. and has relatively high operating temperature of near $12°$ K. The structure is mechanically rugged and chemically inert.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
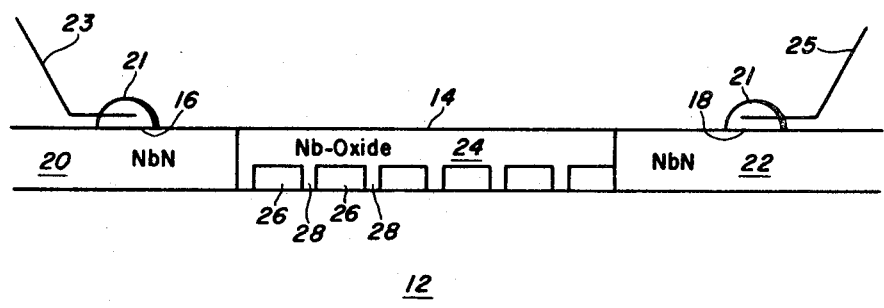
FIG. 1 is a cross-sectional side view of the bolometer.

Referring now to the drawings, wherein like reference numerals designate identical or corresponding parts throughout the several views, thereof, this invention is a superconducting bolometer an important element of which is a very thin granular film of a metallic superconductor fabricated on a thermally conducting but electrically insulating substrate. The invention was implemented with a granular film formed of niobium nitride which embodiment will be described. However it is to be understood that the invention is not to be so limited.

The details of the fabrication technique are partially described by Wolf, Kennedy and Nisenoff in their article in the Journal of Vacuum Science and Technology, vol. 13, page 145-147, 1976 which is incorporated herein by reference.

Figure 2:
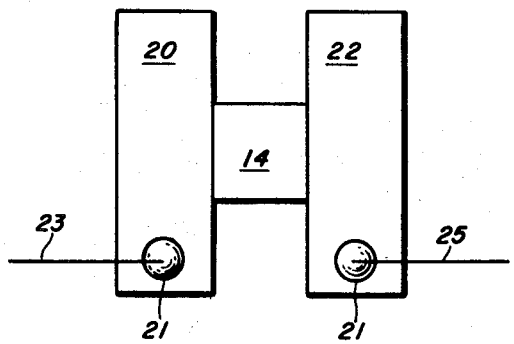
FIG. 2 is a top view of the bolometer.

The cross section of the superconducting film is shown in FIG. 1 and its fabrication will be given in brief detail. Niobium nitride is first deposited onto a sapphire substrate 12. The sapphire is an excellent electrical insulator relative to the metal and is optically transmissive for large parts of the optical spectrum. It however is also a good thermal conductor with a conductance of 35 $W/cm^{2°}K$. at 12° K. Other insulating substrates such as quartz can be used as long as their thermal conductance is at least a tenth that of sapphire and they form a good mechanical bond with the deposited metal. The deposition is accomplished by RF sputtering pure niobium in an ultrahigh vacuum chamber while it is backfilled with 50 to 150 millitorr of a combination of gaseous nitrogen and argon. This variant of RF sputtering is called reactive gas sputtering. The molecular ratio of nitrogen to argon may vary between 0.2 and 2. After deposition of about 20 nm of NbN, this metallic film is photoetched into the shape of an "H". A top view of the photoetched film is shown in FIG. 2. The center bar 14 of the "H" which will become the granular superconductor is about 1 mm by 1 mm. Electrical contacts are made at points 16 and 18 in each of the side arms 20 and 22 of the "H" as shown in FIG. 1 by melting indium solder 21 on top the NbN 20 and 22 and including the copper wire leads 23 and 25 within the indium melt 21.

The center bar is then immersed in a bath of saturated boric acid into which a gold cathode is inserted. A current density of 10 $mA/cm^2$ is passed from one of the leads 23 and 25 through the NbN film forming the bar 14 to the gold cathode. The current acts to anodize the NbN into niobium oxide. The anodization continues until the sheet resistance of the bar 14, as measured between the leads 23 and 25 on the "H", is between 5 and 10 kilohms per square at 300° K. which is 5-10 kilohms for a square bar 14. Alternatively the thickness can be monitored by the method of the last cited reference in which case the effective unanodized thickness is approximately 2 nm.

The resulting structure is believed to be that shown in vertical plane in FIG. 1. It is understood, of course, that the invention does not depend on the details of the structure. The sides 20 and 22 of the NbN are not exposed to the anodizing process. The center bar 14 of the NbN is anodized from the top and converted into an oxide of Nb 24 about 30 nm thick. The width of the bar in FIG. 2 is shown greatly reduced. The anodization is stopped at the point at which the NbN remaining unoxidized is in the shape of grains 26 of about 2-4 nm thickness. These grains 26 are believed to be 8-10 nm in diameter and separated from each other by 1-2 nm regions 28 of nearly amorphous Nb oxide.

The size of the grains given above are the size observed with the anodization process used. It is believed that any grain thickness larger than 2 nm would be usable although thicknesses greater than 20 nm are expected to produce performance not dissimilar from non-granular superconducting bolometers. Grain diameters between 3 and 40 nm should result is usable bolometers. Preferably the diameter should be about twice the grain thickness. These grain sizes should provide good bolometers because it is believed that the conduction mechanism depends on the grain size being comparable to the superconducting coherence length which is 5 nm in NbN.

The structure shown in FIG. 1 presents at least three advantages: (1) the active elements, the niobium nitride grains, account for a very small thermal mass 2 nm thick versus the 50 nm described in the prior art so that the response can be very fast, (2) the niobium oxide backing is much thicker, 30 nm in the example, and provides the structural support for the active element of the bolometer without contributing to its mass, and (3) the structure is rugged, scratch resistant, chemically inert and capable of undergoing repeated thermal cycling. These mechanical and chemical properties derive from the strong and stable niobium oxide 24 protecting the superconducting grains 26.

Figure 3:
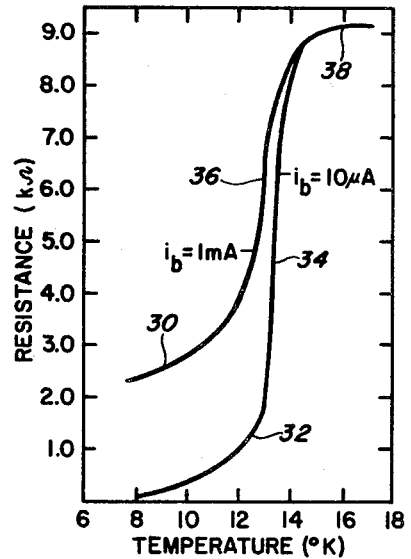
FIG. 3 is a graph of the temperature dependence in degrees Kelvin of the resistance of the bolometer in kilohms.

The temperature dependence of the resistance of a typical fabricated by the foregoing method is shown in the graph of FIG. 3 near 14 K., the superconducting transition temperature of bulk NbN. It is seen that the resistance depends somewhat upon the bias current. More specifically, the resistance measured at 1 mA as given by curve 30 is above that for the 10 microamp curve 32. Conversely, the dynamic resistance, dR/dT, has its greatest value of 6000 ohm/K at section 34 of the 10 microamp curve 32 and 4000 ohm/K at section 36 of the 1 milliamp curve 30. It is seen that the resistance peak 38 at about 9.1 kilohm. The resistance drops slowly at higher temperatures to a value of about 7500 ohms at 300° K.

The bolometer constructed in the above manner needs to be heat sunk in a suitable dewar which can maintain the temperature near the superconducting transition temperature of bulk NbN and preferably in the regions 34 and 36 of steepest slope of the curves of FIG. 2. One such dewar is a helium flow variable temperature dewar. If the bolometer is to be used as an optical detector, the dewar must be provided with windows nearly transparent at the wavelength to be detected.

Figure 4:
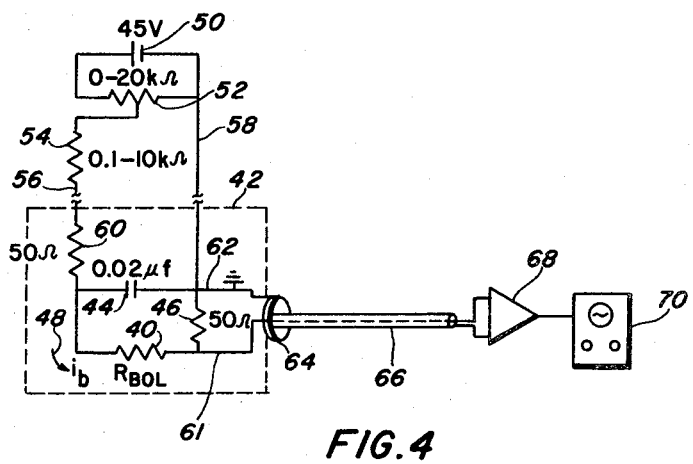
FIG. 4 is a schematic diagram of the electrical circuitry associated with the bolometer.

One example of a bias network which may be utilized to implement the bolometer is shown in FIG. 4 in which the granular film of the bolometer is represented by $R_{BOL}$ 40 which is a temperature dependent resistance. The bolometer film 40 is placed inside a dewar represented by a dashlined box 42. An RC detecting network comprising a capacitor 44 of 0.02 micro farad and resistor 46 of 50 ohm is placed as close to the bolometer film 40 as possible, i.e. inside the dewar 42, in order to minimize impedance mismatch and subsequent electrical signal reflection. A DC bias current $i_b$ 48 of between 10 microamp and 1 milliamp is maintained on the bolometer film 40 by an external power supply, preferably left floating. A battery 50 of nominal 45 V rating has been used for this purpose in parallel with a potentiometer 52 of 0–20 kilohm rating adjustable to obtain the desired bias current 48. The bias current can be read by monitoring the voltage drop across the measuring resistor 54 of between 0.1 and 10 kilohm inserted in one of two leads 56 and 58 from the power supply to the dewar. Another loading resistor 60 of 50 ohm is inserted in one of the power supply leads 56 and 58 within the dewar 42.

A heat pulse incident on the biased bolometer film 40 will produce an electrical signal in the signal output leads 61 and 62. These leads are connected to an RF feed-through 64 penetrating the dewar 42 with the lead 62 connected between the capacitor 44 and resistor 46 of the detecting network being the ground lead. A 50 ohm coaxial cable 66 connects the RF feedthrough 64 to an amplifier 68 which amplifies the signal for display on an oscilloscope 70. If the oscilloscope is 70 is sensitive enough for the generated signal no separate amplifier 68 is needed.

Figure 5:
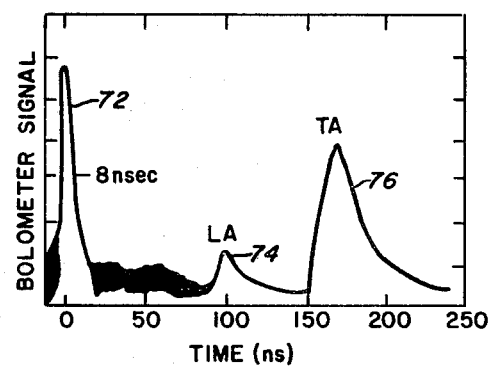
FIG. 5 is a graph of the response in arbitrary units of the bolometer to photons and phonons.

The operation of the bolometer was tested with a bolometer which was fabricated on one side of a 1 mm thick sapphire disc-shaped substrate. An additional 20 nm thick NbN heater film was deposited on the other side of the 1 nm substrate. An attenuated 8 ns long pulse was emitted from a nitrogen pumped dye laser at 579.6 nm with a total energy of 350 microjoule. At this wavelength, the sapphire substrate is near transparent. The resultant response of the bolometer held near 12° K. is shown in FIG. 5. The initial peak 72 of the curve represents the direct heating of the bolometer by the photons in the laser pulse. Since the width of this peak is, within experimental accuracy, the same width as the laser pulse, the temporal response of the bolometer is shown to be less than 1 ns. The next two peaks 74 and 76 of the curve are believed to represent the ballistic phonons or phonon waves, generated in the NbN heater film on the opposite side of the sapphire and detected in the bolometer after travelling 1 mm through the sapphire substrate. The first phonon peak 74 is that due to the longitudinal acoustic phonons which propagate faster than the transverse acoustic phonons causing the second peak 76. The widths of the phonon peaks 74 and 76 are somewhat larger than the width of the exciting laser pulse mainly, it is believed, because of geometric effects caused by the lateral dimensions of the bolometer equalling the phonon travel paths.

The actual temporal response of the bolometer has not been measured but is believed to be less than 100 ps based on theoretical arguments which are included in the article by Weiser, Strom, Wolf and Gubser in the Journal of Applied Physics, vol. 52, pages 4888 and 4889, 1981 which is herein incorporated by reference. This predicted 100 ps response time is a factor of 20 better than the best response time given in the background.

One of the advantages of this bolometer is the relatively high superconducting transition temperature of about 12° K. for granular NbN near which this bolometer can operate. However for those applications in which a lower temperature operation is desired, the superconducting transition temperature can be lowered by the application of a magnetic field, preferably perpendicular to the bolometer surface. Gubser and Wolf have described the magnetic properties of these granular NbN films in "Ordering in Two Dimension", edited by Sinha, 1980, Elsevier-North Holland, which is incorporated herein by reference. It is estimated that the application of a magnetic field of 10 T will reduce the operating temperature of the bolometer by 7° K. Lesser magnetic fields are correspondingly less effective in depressing the superconducting transition temperature.

Figure 6:
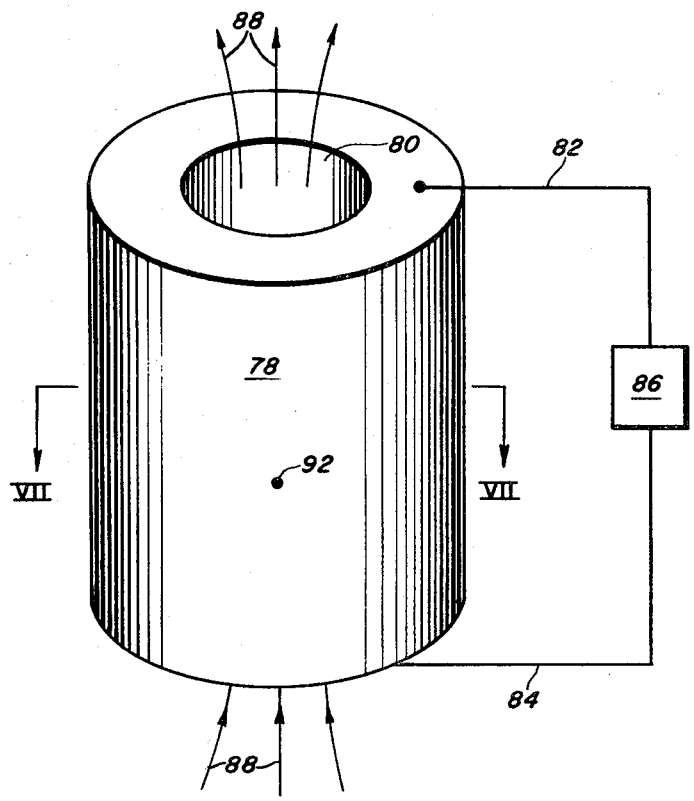
FIG. 6 is a perspective view of a magnetic-field producing coil.
Figure 7:
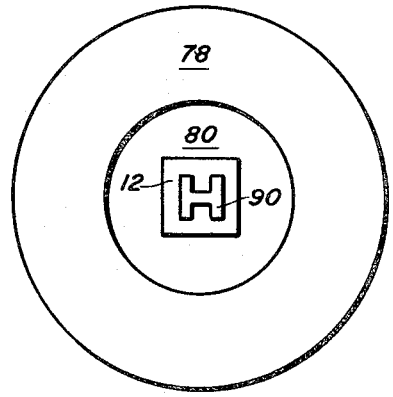
FIG. 7 is a cross section of FIG. 6 showing the bolometer location.

Magnetic fields of these magnitudes can be produced by a superconducting or a Bitter magnet in a configuration shown in FIG. 6. Both Bitter and superconducting magnets are wound in a thick coil 78 with an axial aperture 80. The conductor of the coil is connected through electrical leads 82 and 84 to a power supply 86. The power supply 86 is designed so that it controls the current flowing through the coil 78 and thus the axial magnetic field 88 in the aperture 80. With reference to FIG. 7, the substrate 12 containing the "H" shaped NbN film 90 is positioned near the axial midpoint 92 of the aperture 80 such that the magnetic field 88 is normal to the NbN film 90. Not shown in FIGS. 6 or 7 is the cryogenic cooling apparatus for the superconducting NbN film 90 nor the electrical biasing and detecting circuitry. Also not shown is cryogenic cooling apparatus for a superconducting coil 78 nor water cooling lines for a Bitter coil 78.

Although the embodiment of the bolometer described here is fabricated from NbN, the invention can be made of other materials. Similar structures made from niobium have been tested and vanadium along with other materials are believed to produce a bolometer with characteristics similar to the herein described NbN bolometer. The choice of superconducting metal to be anodized for such a bolometer is believed to be dictated primarily by the metal's superconducting transition temperature which controls the upper temperature limit of the resulting bolometer's operation. With these different metals it is required to match the grain size to the superconducting coherence length of the metal by adjusting the anodizing parameters.

Thus it is seen that a bolometer can be made and used which has a temporal response of at least 1 ns and probably less than 100 ps and which is sensitive to short pulses of either photons or phonons. The bolometer can be operated at 12° K. with simple support and detection circuitry.

Obviously, additional modification and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bolometer, comprising:
   a substrate of material that is thermally conductive but electrically insulating;
   a superconducting granular thin film formed by partially anodizing a continuous thin film of the material of the grains of said granular thin film, said continuous thin film being deposited upon said substrate;
   two spaced electrical contacts to said granular film;
   cooling means for maintaining said substrate at a substantially constant temperature near the superconducting transition temperature of said grains;
   a biasing network for impressing a current through said granular film; and
   a detecting network for measuring resistance changes in said granular film.

2. A bolometer as recited in claim 1, wherein the granular thin film consists essentially of niobium nitride.

3. A bolometer as recited in claim 1, wherein the granular thin film consists essentially of niobium.

4. A bolometer as recited in claim 1, wherein the granular thin film consists essentially of vanadium.

5. A bolometer as recited in claim 2, wherein the grains of niobium nitride are of thickness between 2 and 4 nm and of diameter between 8 and 10 nm.

6. A bolometer as recited in claim 2, wherein the grains of niobium nitride are of thickness between 2 and 20 nm and of diameter between 3 and 40 nm.

7. A bolometer as recited in claim 1 or 5, wherein the substrate is sapphire.

8. A bolometer as recited in claim 1, further comprising means for applying a magnetic field so that the superconducting transition temperature is lowered.

* * * * *